(12) United States Patent
Lupton et al.

(10) Patent No.: US 7,929,132 B2
(45) Date of Patent: Apr. 19, 2011

(54) TRANSMISSION MICROSCOPY USING LIGHT EMITTED FROM NANOPARTICLES

(75) Inventors: John Mark Lupton, Salt Lake City, UT (US); Michael H. Bartl, Salt Lake City, UT (US); Debansu Chaudhuri, Salt Lake City, UT (US); Jeremy Galusha, Arlington, VA (US); Nicholas Borys, Salt Lake City, UT (US); Manfred Josef Walter, Unterfoehring (DE)

(73) Assignee: University of Utah Research Foundation, Salt Lake City, UT (US)

( * ) Notice: Subject to any disclaimer, the term of this patent is extended or adjusted under 35 U.S.C. 154(b) by 95 days.

(21) Appl. No.: 12/501,068

(22) Filed: Jul. 10, 2009

(65) Prior Publication Data

US 2011/0007386 A1  Jan. 13, 2011

Related U.S. Application Data

(60) Provisional application No. 61/080,097, filed on Jul. 11, 2008.

(51) Int. Cl.
*G01J 3/10* (2006.01)

(52) U.S. Cl. ......... 356/301; 359/385; 977/904; 977/949

(58) Field of Classification Search .................. 359/385; 977/902, 904, 949, 950, 963; 356/301
See application file for complete search history.

(56) References Cited

U.S. PATENT DOCUMENTS

| | | | | |
|---|---|---|---|---|
| 7,538,329 B2* | 5/2009 | Chen et al. | ............... | 250/370.11 |
| 7,659,977 B2* | 2/2010 | Koo | ............... | 356/301 |
| 7,742,164 B1* | 6/2010 | Phillips et al. | ............. | 356/243.2 |
| 7,830,507 B2* | 11/2010 | Brady et al. | .................. | 356/328 |
| 2008/0020483 A1* | 1/2008 | Nishigaki et al. | ............... | 436/172 |
| 2008/0191604 A1* | 8/2008 | Morris et al. | .................. | 313/499 |
| 2008/0266555 A1* | 10/2008 | Murphy et al. | ............... | 356/301 |
| 2010/0120132 A1* | 5/2010 | Koo | ........................... | 435/287.2 |
| 2010/0196920 A1* | 8/2010 | Lee et al. | ....................... | 435/7.1 |
| 2010/0261263 A1* | 10/2010 | Vo-Dinh et al. | ............ | 435/287.1 |
| 2010/0264334 A1* | 10/2010 | Cao et al. | .................. | 250/459.1 |

OTHER PUBLICATIONS

Jensen et al., Nanosphere Lithography: Tunable Localized Surface Plasmon Resonance Spectra of Silver Nanoparticles, J. Phys. Chem. B, Oct. 10, 2000, p. 10549-10556.*
Hell, S. W., *Science* 2007, 316, 1153-1158.
Moerner, W. E.; Fromm, D. P., *Rev. Sci. Instrum.* 2003, 74, 3597-3619.
Michalet, X.; Kappanidis, A. N.; Laurence, T.; Pinaud, F.; Doose, S.; Pflughoefft, M.; Weiss, S., *Annu. Rev. Biophys. Biomol. Struct.* 2003, 32, 161-182.
Westphal, V.; Hell, S. W., *Phys. Rev. Lett.* 2005, 94, 143903.

(Continued)

*Primary Examiner* — Mark Consilvio
(74) *Attorney, Agent, or Firm* — Workman Nydegger

(57) ABSTRACT

Systems and methods for performing transmission microscopy on a sample material are disclosed. The sample material is placed on a metal nanoparticle substrate. High intensity light, such as an infrared laser, is focused on the nanoparticle substrate, thereby exciting the silver nanoparticles. The excited nanoparticles emit intensely focused, spectrally broad white light that is able to pass through the sample material without significant scattering even when the sample material is highly diffuse. The emitted light that passes through the sample material is detected and used to generate images and characterize features of the sample material, including the internal structural composition of the sample material.

20 Claims, 6 Drawing Sheets

OTHER PUBLICATIONS

Frank, J. H.; Elder, A. D.; Swartling, J.; Venkitaraman, A. R.; Jeyasekharan, A. D.; Kaminski, C. F., *J. Microsc.* 2007, 227, 203-215.
Betzig, E.; Trautman, J. K.; Harris, T. D.; Weiner, J. S.; Kostelak, R. L., *Science* 1991, 251, 1468-1470.
Hecht, B.; Beate, S.; Wild, P. U.; Deckert, V.; Zenobi, R.; Martin, O. J. F.; Pohl, D. W., *J. Chem. Phys.* 2000, 112, 7761-7774.
Lezec, H. J.; Degiron, A.; Devaux, E.; Linke, R. A.; Martin-Moreno, L.; Garcia-Vidal, F. J.; Ebbesen, T. W., *Science* 2002, 97, 820-822.
Garcia-Vidal, F. J.; Martin-Moreno, L.; Lezec, H. J.; Ebbesen, T. W., *Appl. Phys. Lett.* 2003, 83, 4500-4502.
Stark, P. R. H.; Halleck, A. E.; Larson, D. N., *Proc. Natl. Acad. Sci. U.S.A.* 2007, 104, 18902-18906.
Galusha, J. W.; Richey, L. R.; Gardner, J. S.; Cha, J. N.; Bartl, M. H., *Phys. Rev. E* 2008, 77, 050904.
Vukusis, P.; Sambles, J. R., *Nature* 2003, 424, 852-855.
Parker, A. R.; Townley, H. E., *Nat. Nanotechnol.* 2007, 2, 347-353.
Maldovan, M.; Thomas, E. L., *Nat. Mater.* 2004, 3, 593.
Pohl, D. W.; Denk, W.; Lanz, M., *Appl. Phys. Lett.* 1984, 44, 651-653.
Michaelis, J.; Hettich, C.; Mlynek, J.; Sandoghdar, V., *Nature* 2000, 405, 325-328.
Schonbrun, E.; Wu, Q.; Park, W.; Yamashita, T.; Summers, C. J.; Abashin, M.; Fainman, Y., *Appl. Phys. Lett.* 2007, 90, 041113.
Flück, E.; van Hulst, N. F.; Vos, W. L.; Kuipers, L., *Phys. Rev. E.* 2003, 68, 015601.
Koenderink, A. F.; Kafesaki, M.; Buchler, B. C.; Sandoghdar, V., *Phys. Rev. Lett.* 2005, 95, 153904.
Wang, Z.; Pan, S.; Krauss, T. D.; Du, H.; Rothberg, L. J., *Proc. Natl. Acad. Sci. U.S.A.* 2003, 100, 8638-8643.
Walter, M. J.; Lupton, J. M.; Becker, K.; Feldmann, J.; Gaefke, G.; Höger, S., *Phys. Rev. Lett.* 2007, 98, 137401.
Weiss, A.; Haran, G., *J. Phys. Chem. B* 2001, 105, 12348-12354.
Birke, R. L.; Lombardi, J. R.; Gersten, J. I., *Phys. Rev. Lett.* 1979, 43, 71-75.
Brouers, F.; Blacher, S.; Lagarkov, A. N.; Sarychev, A. K.; Patrice, G.; Shalaev, V. M., *Phys. Rev. B* 1997, 55, 13234-13244.
Dieringer, J. A.; Lettan, R. B.; Scheidt, K. A.; Van Duyne, R. P., *J. Am. Chem. Soc.* 2007, 129, 16249-16256.
Nie, S.; Emory, S. R., *Science* 1997, 275, 1102-1106.
Kneipp, K.; Wang, Y.; Kneipp, H.; Perelman, L. T.; Itzkan, I.; Dasari, R. R.; Feld, M. S., *Phys. Rev. Lett.* 1997, 78, 1667-1670.
Shen, Y.; Friend, C. S.; Jiang, Y.; Jacubczyk, D.; Swiatkiewicz, J.; Prasad, P. N., *J. Phys. Chem. B* 2000, 104, 7577-7587.
Zolotavin, P.; Permoenova, E.; Sarkisov, O.; Nadtochenko, V.; Azouani, R.; Portes, P.; Chhor, K.; Kanaev, A., *Chem. Phys. Lett.* 2008, 457, 342-346.
Walter, M. J.; Borys, N. J.; Gaefke, G.; Höger, S.; Lupton J. M., *J. Am. Chem. Soc.* 2008, 130, 16830-16831.
Stockman, M. I.; Faleev, S. V.; Bergman, D. J., *Phys. Rev. Lett.* 2002, 88, 067402.
Aeschlimann, M.; Bauer, M.; Bayer, D.; Brixner, T.; Garcia de Abajo, F. J.; Pfeiffer, W.; Rohmer, M.; Spindler, C.; Steeb, F., *Nature* 2007, 446, 301-304.
Andersen, P. C.; Jacobson, M. L.; Rowlen, K. L., *J. Phys. Chem. B* 2004, 108, 2148-2153.
Huang, X.; El-Sayed, I. H.; Qian, W.; El-Sayed, M. A., *J. Am. Chem. Soc.* 2006, 128, 2115-2120.
Yu, J.; Patel, S. A.; Dickson, R. M., *Angew. Chem., Int. Ed.* 2007, 46, 2028-2030.
Shalaev, Vladimir M., *Electromagnetic Properties of Small-Particle Composites*, 1996, 77 pages.
Markel, V. A., *Small-Particle Composites. I. Linear Optical Properties*, 1996, 12 pages.
Shalaev, Vladimir M., *Small-Particle Composites. II. Nonlinear Optical Properties*, 1996, 13 pages.
Shalaev, Vladimir M., *Optical Properties of Self-Affine Thin Films*, 1996, 8 pages.
Stockman, Mark I, *Enhanced Raman Scattering by Fractal Cluster: Scale-Invariant Theory*, 1992, 11 pages.
Shalaev, Vladimir M., *Nonlinear Optics of Random Metal-Dielectric Films*, 1998, 24 pages.
Poliakov, Evgeni Y., *Nonlinear Optical Phenomena on Rough Surfaces of Metal Thin Films*, 1998, 13 pages.
Markel, V. A. *Near-Field Optical Spectroscopy of Individual Surface-Plasmon Modes in Colloid Cluster*, 1999, 7 pages.
Poliakov, Eugene, *Enhancement of Nonlinear Processes Near Rough Nanometer-Structured Surfaces Obtained by Deposition of Fractal Colloidal Silver Aggregates on a Plain Substrate*, 1999, 4 pages.
Grésillon, S., *Experimental Observation of Localized Optical Excitations in Random Metal-Dielectric Films*, 1999, 4 pages.

* cited by examiner

TRANSMISSION MICROSCOPY USING LIGHT EMITTED FROM NANOPARTICLES

CROSS-REFERENCE TO RELATED APPLICATIONS

This application claims priority to and the benefit of U.S. Provisional Patent Application No. 61/080,097, filed Jul. 11, 2008, entitled SUBDIFFRACTION WIDE-FIELD WHITE LIGHT TRANSMISSION MICROSCOPY OF NEAR-OPAQUE MEDIA, which is incorporated herein by reference in its entirety.

STATEMENT REGARDING FEDERALLY SPONSORED RESEARCH OR DEVELOPMENT

This invention was made with government support under grant or award Nos. CHE-ASC 748473 and ECS 0609244, awarded by the National Science Foundation. The Government has certain rights to this invention.

BACKGROUND OF THE INVENTION

1. The Field of the Invention

The present invention relates generally to the field of microscopy. More specifically, the invention relates to using a fluorescence microscope and nanoparticles to perform transmission microscopy of diffuse materials.

2. The Relevant Technology

Microscopy is the technical field of using microscopes to view samples or objects. Optical microscopes were first developed in the 17th century. Since then, microscopy has grown to the point where there are several types of microscopes and scores of different methods available for viewing samples. The development of microscopy revolutionized biology and remains an essential tool in that science, along with many others including materials science and numerous engineering disciplines.

A well know and widely used technique for performing optical microscopy is transmission microscopy, which involves passing visible light through a sample. The transmitted light is then passed through one or more lenses to provide a magnified view of the sample. The transmitted light can be detected directly by the eye, imaged on a photographic plate, or captured digitally. A single lens with its attachments, or a system of lenses and imaging equipment, along with the appropriate lighting equipment, sample stage and support, makes up the basic light microscope.

Transmission microscopy has many advantages. For instance, the necessary equipment is relatively simple to set up and use. Furthermore, samples being observed often do not require extensive preparation. This allows some live cells to be viewed. There are, however, various limitations associated with transmission microscopy. Transmission microscopy can usually only effectively image dark or strongly refracting objects, or objects with sufficient contrast. Many biological samples, including many live cells, generally lack sufficient contrast to be studied successfully because the internal structures of the cells are colorless and transparent. The most common way to increase contrast in a sample is to stain the different structures with selective dyes. Staining the sample involves killing and fixing the sample. Additionally, staining may also introduce artifacts that appear as structural details of the sample, but which are caused by the processing of the sample and are thus not legitimate features of the sample. Additionally, without using far more complex techniques, the diffraction limit of light limits the spatial resolution of the sample image to approximately half of the wavelength of light. Still further, the resolution/clarity of the image can be limited or negatively affected by out of focus light from points outside the focal plane.

Another widely used method is known as laser or fluorescence microscopy, in which a laser is used to make a specimen emit light, either because the specimen does so naturally or because it has been injected with fluorescent dye. More specifically, when certain compounds are illuminated with high energy light, they then emit light of a different frequency. This absorption-emission effect is known as fluorescence. Just as staining a sample with a dye for transmission microscopy kills the specimen, the injection of a fluorescent dye into a specimen viewed by fluorescence microscopy also leads to killing the specimen. More particularly, when excited by the laser light used during fluorescence microscopy, such dyes generate toxic chemicals that kill living cells.

Fluorescence microscopy is strictly limited to suitably autofluorescent or stained samples. Therefore, fluorescence microscopy is sensitive primarily to the surfaces of a specimen (such as cell membranes) from which light emission occurs. However, many material properties in the life sciences and in materials science are controlled by the bulk arrangement of matter. Thus, such materials are best probed by transmission microscopy. As discussed above, however, typical transmission microscopy is subject to limitations that prevent the obtaining of clear, high resolution images of many samples.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

The present invention relates to using a fluorescence microscope and nanoparticles to perform transmission microscopy of diffuse materials. More specifically, the invention uses a laser beam to excite clusters of nanoparticles placed below a sample being studied. When excited, the nanoparticles form plasmonic hotspots that transmit intensely focused white light through the overlying sample. The transmitted light can be detected and used to reveal information about the composition and structure of the examined sample. The invention enables the imaging of the internal structure of nearly opaque biological materials like bone, tumor cells, scales, and the like. Additionally, the invention can also be used to detect structural characteristics, such as fatigue, in materials such as carbon-fiber plastics, semiconductors, and the like.

In one implementation, the invention comprises a method for performing transmission microscopy on a sample material that includes placing the sample material adjacent to a substrate that includes one or more nanoparticles. The nanoparticles can include one or more metals, such as noble metals or coinage metals. The substrate can be formed using the Tollens silver mirror reaction. The nanoparticles are excited, such as with an infrared light, a visible light, cathodoluminescence, electroluminescence, or chemiluminescence, in order to cause the nanoparticles to emit white light. The white light generated by the nanoparticles is passed through the sample material and detected in order to image the sample material.

In another exemplary implementation, a method for performing transmission microscopy includes generating an infrared light that is reflected off a dichroic mirror and focused through a sample material and onto a nanoparticle film. The infrared light can be focused using an objective. Nanoparticles in the nanoparticle film are excited by the infrared light to cause the nanoparticles to emit white light. The emitted white light is passed through the sample material and the dichroic mirror and is detected by a detector. The emitted white light can also be passed through an emission filter in order to filter out scattered light. The emitted white light can be detected using a spectrometer, photographic plate, a digital medium, or an eye.

In yet another implementation, a system for performing transmission microscopy comprises a film of silver nanoparticles that is adapted to have a sample material positioned thereon. The silver nanoparticles emit white light when they are excited by light directed at the film from a light source, such as an infrared laser. The light generated by the light source can pass through the sample material before reaching the film and exciting the nanoparticles. The white light from the nanoparticles is passed through the sample material and to a detector that is adapted to detect the white light. The system can also include a dichroic mirror that reflects the light from the light source toward the film. The dichroic mirror can be placed between the film and the detector so that the white light emitted by the silver nanoparticles passes through the dichroic mirror before reaching the detector. Additionally, the sample material can be placed on the film so that the sample material is positioned between the film and the dichroic mirror.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to using a fluorescence microscope and nanoparticles to perform transmission microscopy of diffuse materials. More specifically, the invention uses a laser beam, visible light, cathodoluminescence, electroluminescence, or chemiluminescence to excite clusters of nanoparticles placed below a sample being studied. When excited, the nanoparticles form plasmonic hotspots or nanoscale light beacons that transmit intensely focused white light through the overlying sample. The transmitted light can be detected and used to reveal information about the composition and structure of the examined sample. The invention enables the imaging of highly scattering samples and the internal structure of nearly opaque biological materials like bone, tumor cells, scales, and the like. Additionally, the invention can also be used to detect structural characteristics, such as fatigue, in materials such as carbon-fiber plastics, semiconductors, and the like.

Figure 1A:
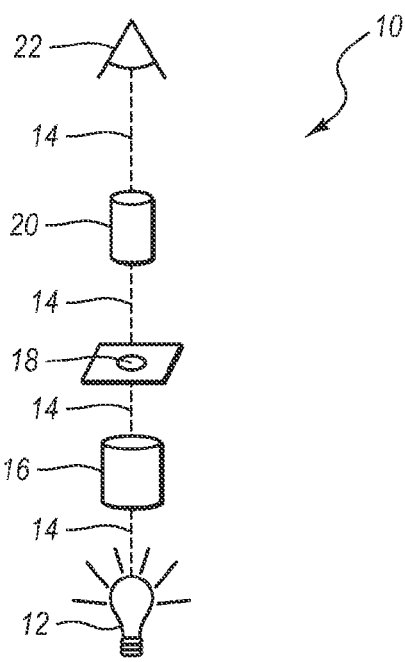
FIG. 1A illustrates an exploded schematic view of the basic components of a transmission microscope.
Figure 1B:
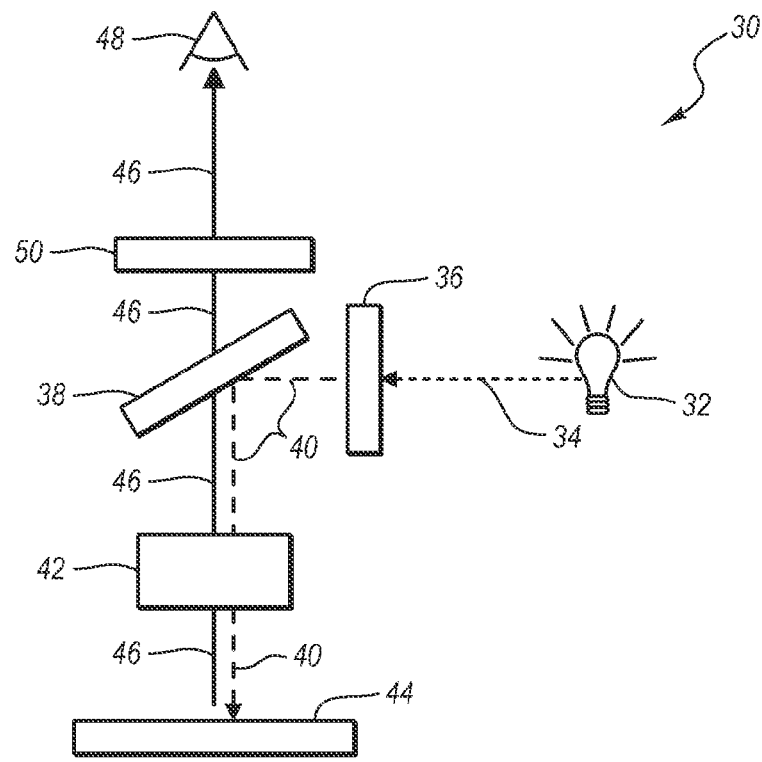
FIG. 1B illustrates an exploded schematic view of the basic components of a fluorescence microscope.

The popular conception of optical microscopy generally involves transmission measurements, even though most contemporary high-resolution microscopes are based on fluorescence. The present invention uses various features of transmission microscopy and fluorescence microscopy to provide high resolution images of samples that are difficult to clearly image with only a transmission microscope or a fluorescence microscope. FIG. 1A illustrates a schematic representation of a basic transmission microscope, and FIG. 1B illustrates a schematic representation of a basic fluorescence microscope. With reference to FIGS. 1A and 1B, the components and functions of these basic microscopes will be discussed; afterwards the details of the present invention will be discussed in greater detail.

FIG. 1A illustrates the basic components of a simple transmission microscope 10. Transmission microscopy relies on light being passed through a sample in order to view an image of the sample. Microscope 10 includes light source 12 that generates the light 14 that is passed through a sample. While FIG. 1A illustrates light source 12 as a simple light bulb, it will be understood that other types of light sources are commonly used in transmission microscopes. The light 14 generated by light source 12 is passed through a condenser 16. The optics of condenser 16 bend the incoming bundle of light rays, changing its shape from a tube to a cone. When properly adjusted this light cone provides intense, even illumination of the sample 18. The light 14 then passes through sample 18 and enters the front element of the objective 20. The objective 20 is a lens system that performs most of the magnifying of microscope 10. After passing through objective 20, the light beam 14 passes on to a detector 22, such as a person's eye, a photographic plate, or digital medium.

FIG. 1B illustrates the basic components of a fluorescent microscope 30. Fluorescent microscopy uses a much higher intensity light to illuminate a sample than a conventional transmission microscope, such as microscope 10 illustrated in FIG. 1A. The higher intensity light excites fluorescence species in the sample, which then emit light of a different wavelength. A fluorescent microscope, such as microscope 30 of FIG. 1B, also produces a magnified image of a sample, but the image is based on the light emanating from the fluorescent species rather than from the light originally used to illuminate and excite the sample.

Fluorescent microscope 30 includes light source 32, such as a laser, a xenon arc lamp, or a mercury-vapor lamp. The light 34 generated by light source 32 is passed through an excitation filter 36 in order to select the excitation wavelength for the fluorescence species in the sample. A dichroic mirror 38 reflects the filtered excitation light 40 through an objective 42. Objective 42 focuses the filtered excitation light 40 toward the sample 44. The focused and filtered excitation light 40 is absorbed by sample 44. This absorption of excitation light 40 causes the fluorescence species in sample 44 to become excited. The fluorescence species emit light when they return to their non-excited state. The light 46 emitted by the fluorescence species in sample 44 is of a different wavelength than filtered excitation light 40. The emitted light 46 passes through objective 42 and dichroic mirror 38. Dichroic mirror 38 is configured to separate the filtered excitation light 40 and the emitted light 46, thereby reflecting the filtered excitation light into the objective 42 and allowing the emitted light 46 to pass therethrough. The emitted light 46 can then be detected by a detector 48, such as a person's eye, a photographic plate, or digital medium.

When excitation light 40 illuminates sample 44, a small amount of excitation light 40 can be reflected off the optical elements within objective 42 and some excitation light 40 is scattered back into objective 42 by sample 44. Some of this reflected excitation light 40 is transmitted through dichroic mirror 38 along with the emitted light 46. This reflected light can blur the image of sample 44. Therefore, an emission filter 50 can be placed between dichroic mirror 38 and detector 48 to filter out reflected excitation light.

Figure 2:
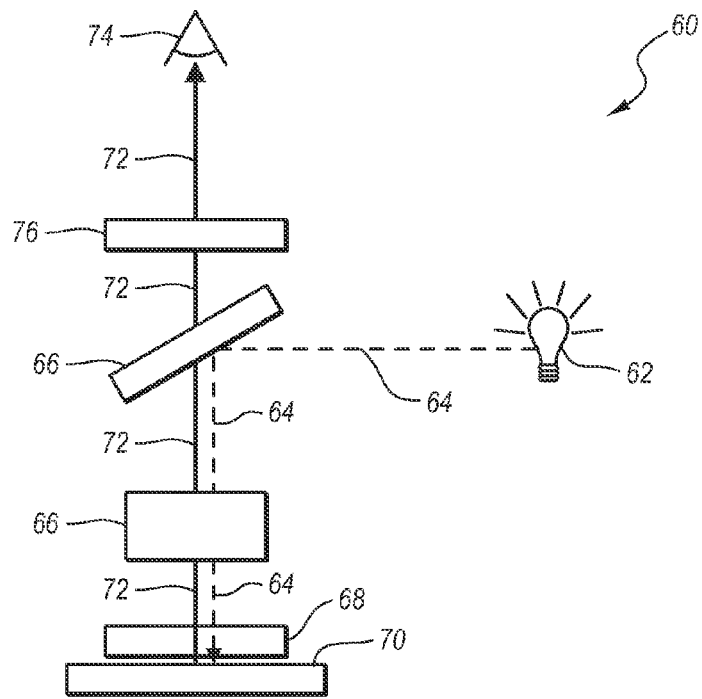
FIG. 2 illustrates an exploded schematic view of a transmission microscopy system according to the present invention.

Attention is now directed to FIG. 2, which illustrates a transmission microscopy system 60 according to one exemplary embodiment of the present invention. The embodiment illustrated in FIG. 2 includes a two-photon fluorescence microscope similar to microscope 30 from FIG. 1B. In particular, microscopy system 60 includes an excitation means 62 that is used to excite nanoparticles, as discussed below. In the present embodiment, excitation means 62 is an infrared laser that produces an IR beam 64. It will be understood that other types of excitation means 62 can also be employed in microscopy system 60. For instance, excitation means 62 can comprise a visible light source that generates visible light. Additionally, excitation means 62 can also include systems and devices for cathodoluminescence, electroluminescence, and/or chemiluminescence.

The IR beam 64 from excitation means 62 is directed at a dichroic mirror 66 that reflects the IR beam 64 through an objective 66. In contrast to typical fluorescence microscopes which focus the light on the sample, the objective 66 of the present novel system focuses the IR beam 64 through the sample 68 and onto a nanoparticle film 70 that is placed below the sample 68. In one embodiment, nanoparticle film 70 comprises a silver nanoparticle film prepared following the Tollens silver mirror reaction. When sample 68 is a biological sample, sample 68 readily sticks to nanoparticle film 70 due to the strong van-der-Waals interactions. It is contemplated that nanoparticle film 70 can be formed with other types of metal nanoparticles, including noble metals and coinage metals.

The nanoparticles in the nanoparticle film 70 absorb the IR beam 64, which causes the nanoparticles in nanoparticle film 70 to luminesce. In other words, the nanoparticles in nanoparticle film 70 become excited when they absorb IR beam 64. When the nanoparticles return to their non-excited state, they emit an intensely focused, spectrally broad white-light 72. In this manner, the nanoparticles in nanoparticle film 70 become nanoscale light beacons. The emitted white-light 72 is so intensely focused as a result of being emitted from nanoparticles that the emitted white-light 72 is able to pass up through sample 68 with minimal scattering even when sample 68 is a diffuse material.

After passing up through sample 68, the emitted white-light 72 passes through objective 66 and dichroic mirror 66 toward a detector 74. Dichroic mirror 66 is configured to allow the emitted white-light 72 to pass therethrough while reflecting IR beam 64, thereby allowing the emitted white-light 72 to pass to detector 74. As with detector 48, detector 74 can be a person's eye, a photographic plate, a spectrometer, or a digital medium. Also similar to microscope 30, microscopy system 60 can also include an emission filter 76 to filter out any scattered light, such as from IR beam 64. In one embodiment, emission filter 76 comprises a short-pass filter.

Figure 3:
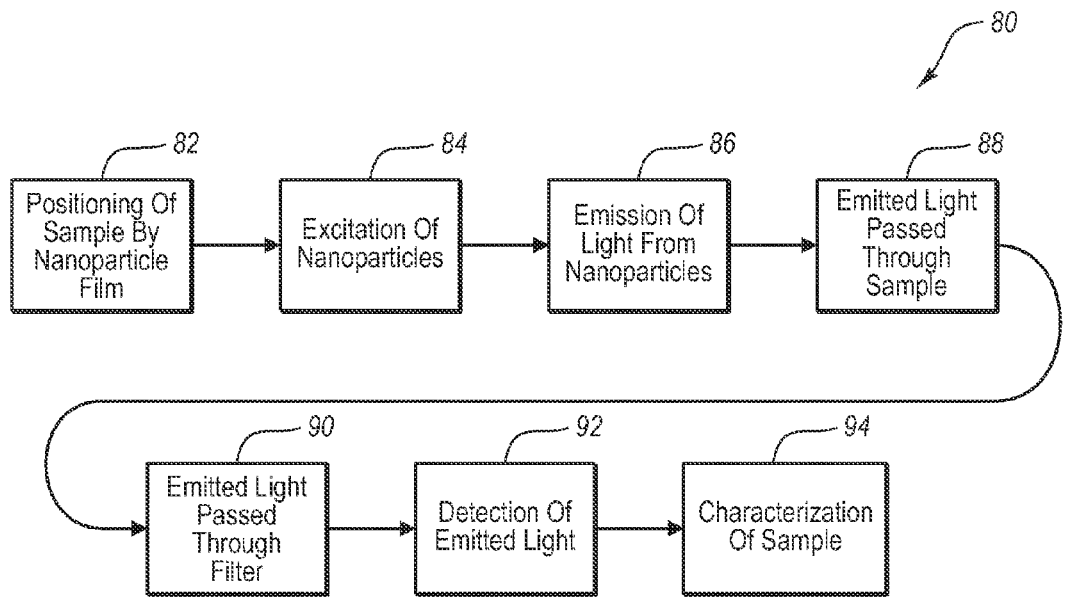
FIG. 3 illustrates a flow diagram of a method for performing transmission microscopy according to the present invention.

Turning attention now to FIG. 3, there is illustrated a flow diagram of an exemplary method for performing transmission microscopy according to the present invention. In the illustrated embodiment, the method 80 begins in a step 82 by positioning a sample adjacent or in close proximity to a nanoparticle film. In some embodiments, the sample is placed directly on the nanoparticle film. Additionally, the sample can be stuck to the nanoparticle film. As described herein, the nanoparticle film can comprise a noble metal, such as silver, or coinage metal nanoparticle film or other type of nanoparticle film that allows for the creation of nanoscale light beacons that emit intensely focused, spectrally broad white light.

In a step 84, the nanoparticles in the nanoparticle film are excited such as with a high intensity light, such as an IR beam, visible light, cathodoluminescence, electroluminescence, and/or chemiluminescence. When using visible light or an IR beam, the light is focused or directed onto the nanoparticle film, either directly or using a dichroic mirror and/or an objective. The light can be shown directly onto the nanoparticle film, or the light can be passed through the sample before reaching the nanoparticle film. In any case, once the light reaches the nanoparticle film, the light is absorbed by the nanoparticles. The absorption of the light causes the nanoparticles to become excited. As a result of the excitation of the nanoparticles, the nanoparticles luminesce/fluoresce (i.e., emit light, such as intensely focused, spectrally broad white light) in a step 86. The light emitted by the nanoparticles is passed through the sample in a step 88. The emitted light is then optionally passed through an emission filter in a step 90 to filter out any scattered light. In a step 92 the emitted light is detected by a detector, such as a person's eye, a photographic plate, a spectrometer, or a digital medium. Once detected, the emitted light can be used to determine various characteristics about the sample in a step 94. Such characteristics can include the composition and structure of the sample.

Turning now to FIGS. 4A-6D, an example of the above-described system and method are provided in connection with the examination of individual crystalline domains formed in the diffuse biological photonic crystals of the scales of a beetle. It is well known that a range of insects derive their coloration from photonic crystals formed in their cuticular exoskeleton. It has been shown that the angular independence in the coloring of certain beetles 100, such as *Lamprocyphus augustus*, shown in FIG. 4A, arises from a near-perfect overlap of photonic stop bands formed in a diamond-based photonic crystal structure, the "champion" photonic crystal morphology.

Figure 4A:
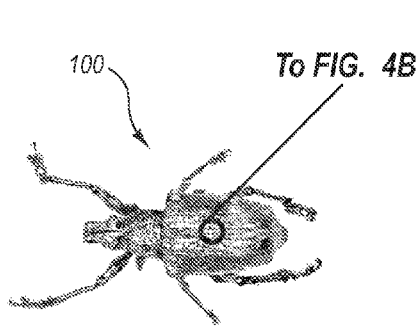
FIG. 4A is a photograph of a beetle examined using the systems and methods of the present invention.
Figure 4B:
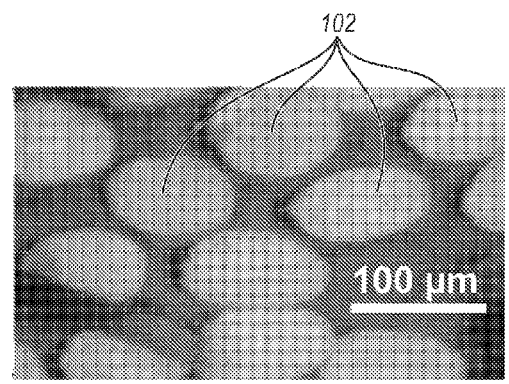
FIG. 4B is an optical micrograph of scales of the beetle of FIG. 4A recorded in reflection mode.

FIG. 4B shows an optical white-light reflection micrograph of the exoskeleton scales 102 of beetle 100, which possess an interior diamond-based photonic structure and hence are responsible for the green appearance. A corresponding transmission spectrum 104, derived from the microscope image shown in the inset 106, is displayed in FIG. 4C. The transmission spectrum 104 exhibits broad composite photonic stop bands between 520 and 620 nm. The reason that the beetle's coloration appears virtually independent of viewing angle lies in the fact that the diamond-based photonic crystal in individual scales is organized in differently oriented single-crystalline domains.

Figure 4C:
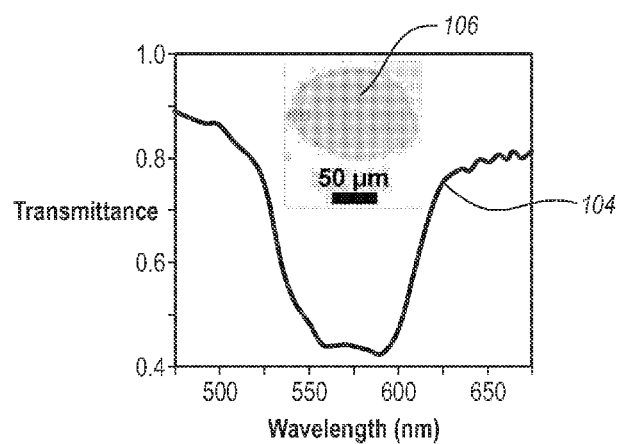
FIG. 4C is a bulk transmission spectrum of a single scale of the beetle of FIG. 4A with an inset showing the white-light transmission image of the single scale.
Figure 4D:
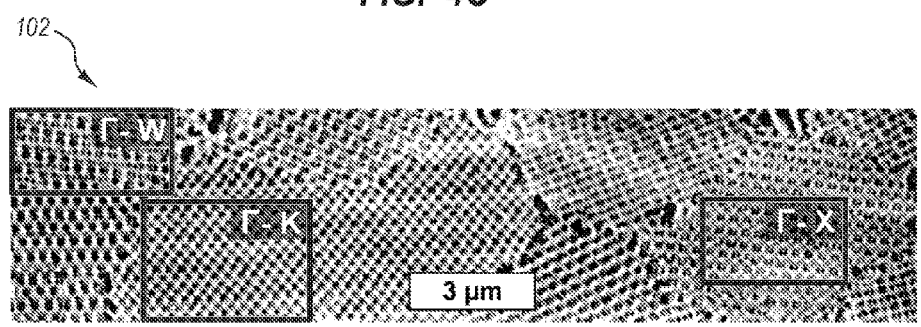
FIG. 4D is an SEM image of a top view of the scale of FIG. 4C showing three distinct crystal facets.

The pixel-type arrangement of the differently oriented single-crystalline domains is exhibited in FIG. 4D, where the top-surface of a single scale 102 was exposed by focused ion beam (FIB) milling and imaged by scanning-electron microscopy (SEM). Elaborate three-dimensional reconstruction of the crystal structure revealed that three dominant crystal domains of the diamond-based structure are oriented with their $\Gamma$-W, $\Gamma$-K, and $\Gamma$-X crystal axes normal or slightly off-normal to the scale top surface. Although band structure calculations and modeling of the photonic crystal with a lattice parameter of 450 nm (with a 10-20% variation of structural dimensions within single scales and between scales sampled from different parts of the beetle) and a dielectric constant of 2.5 for the cuticular material allows the deconvolution of the optical transmission spectrum, as seen in FIG. 4, into three stop bands corresponding to the observed $\Gamma$-W, $\Gamma$-K, and $\Gamma$-X crystal facets, conventional transmission microscopy cannot reveal isolated domains.

Resolving the different crystalline domains in the specimen requires a spatial resolution in optical imaging of the order of the diffraction limit of light. Although this could, in principle, be achieved with near-field scanning microscopy, the technique does not always lend itself readily to the study of soft, inhomogeneous biological compounds. Additionally, the sample itself is thick (~10 μm) and highly scattering and therefore appears opaque in transmission, as is shown in FIG. 4C, implying that it would be nontrivial to couple in light from a tapered fiber.

Figures 5A, 5B, 5C, 5D:
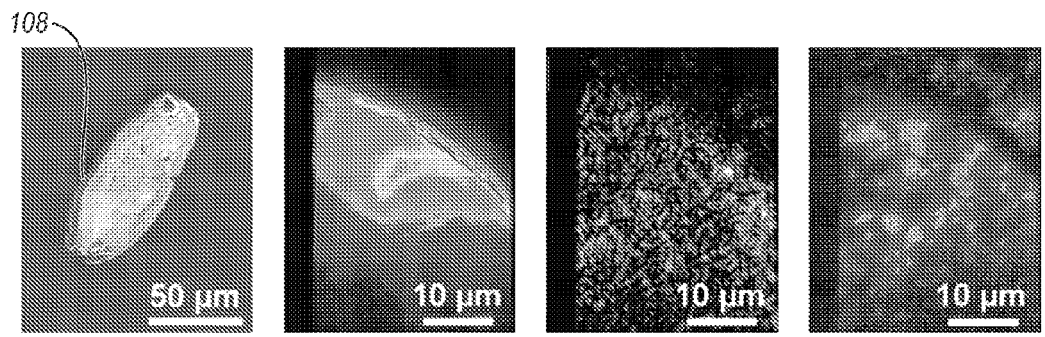
FIG. 5A is an SEM micrograph of the scale of the beetle shown in FIG. 4A positioned on a Tollens silver SERS substrate.
FIG. 5B is a fluorescence image of the scale of FIG. 5A at 440 nm excitation.
FIG. 5C is a image of the Rayleigh scattering of the scale FIG. 5A at 920 nm light.
FIG. 5D is an image of two-photon white-light beacons shining through the scale of FIG. 5A, revealing the same overall spatial structure of the scale as shown in FIG. 5C.

An alternative to nanoscale apertures previously explored in white-light transmission microscopy is given by broadband nanoscale light beacons, as described herein, which are excited at a wavelength to which the specimen appears transparent. Silver nanoparticle films as employed for single molecule surface-enhanced Raman scattering (SERS) can generate stable and spectrally broad light from subdiffraction spots, both under one- and two-photon excitation. Two-photon luminescence from fractal silver films involves surface plasmon-mediated enhancement of the fundamental field. In the present example, the particularly broad luminescence generated under two-photon irradiation was used to probe the transmission of light through a sample over a subdiffraction cross-sectional area. FIG. 5A displays an SEM image of a single beetle scale 108 placed on a silver nanoparticle film. The silver nanoparticle film was prepared following the simple Tollens silver mirror reaction. As discussed herein, the strong van-der-Waals interactions cause the beetle scale 108 to readily stick to the nanoparticle film. All measurements for the current example were carried out at 300 K, in vacuo ($10^{-6}$ mbar), using a wide-field fluorescence microscopy setup with a long-working distance (7.7 mm) objective (N.A. 0.55). Similar results may also be obtained in air with somewhat reduced photostability of the silver nanoparticle emission.

FIG. 5B displays an image of the beetle scale 108 obtained using one-photon (440 nm) excitation of the beetle scale 108. The image exhibits spectrally broad autofluorescence. Because of the thickness fluctuations over the beetle scale 108, the fluorescence intensity varies across the image. FIG. 5C displays the same image under excitation at 920 nm (140 fs pulses, 80 MHz repetition rate) and detection of the back-scattered light. The Rayleigh scattering provides an image of the spatial nonuniformities on the surface of the scale 108, which is dominated by an amorphous cuticular shell enclosing the photonic crystal structure. By inserting a short-pass filter into the detection pathway of the microscope and blocking the Rayleigh scattered light, the broadband emission from the nanoparticle hot spots can be imaged through the beetle scale 108, as shown in FIG. 5D. The images of FIGS. 5B-5D show the same spatial position. Notably, autofluorescence from the beetle scale 108 was not observed under two-photon (920 nm) excitation. This is because the detected light was generated beneath and passed through the beetle scale 108. This was confirmed by observation of the variations in the spatial distribution of the discrete spots of silver nanoparticle two-photon luminescence as a result of variations in the polarization and wavelength of the incident laser.

Figure 5E:
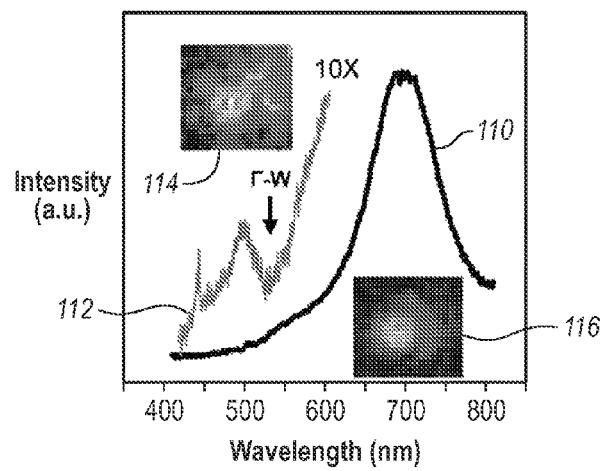
FIG. 5E is a characteristic white-light spectrum from a hot spot compared to a modified white-light spectrum transmitted through the scale of FIG. 5A.
Figure 5F:
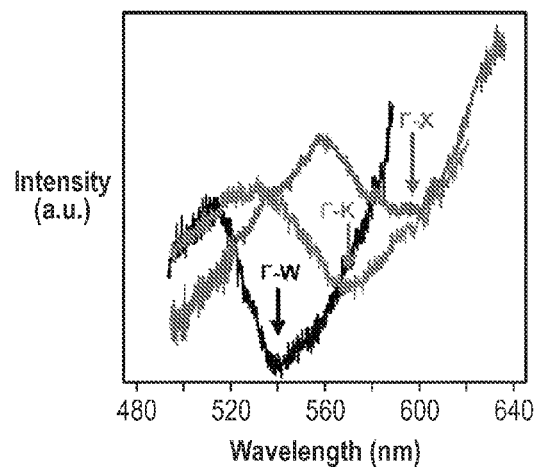
FIG. 5F is a transmitted white-light spectra from different regions of the scale of FIG. 5A indicating the presence of three distinct facets of the photonic crystal.

FIG. 5E compares the emission spectra of two different nanoparticle hot spots under two-photon excitation with and without a photonic crystal placed on top. Whereas the freespace spectrum 110 is broad and featureless, peaking at around 700 nm, the single hot spot emission 112 transmitted through the crystal exhibits significant structure while being attenuated approximately 2-fold by the scattering medium. A strong dip is observed at 530 nm, corresponding to a transmission minimum. The narrow peak at 440 nm arises from surface-enhanced second-harmonic generation on the nanoparticle film. The insets 114, 116 in FIG. 5E show the Airy rings imaged from typical single hot spots, which appear slightly diffused in the case of transmission through the photonic crystal. As various spot locations are chosen from the hot spot transmission image (FIG. 5D), different narrow minima in the broad white-light spectrum are identified as shown in FIG. 5F.

Figure 5G:
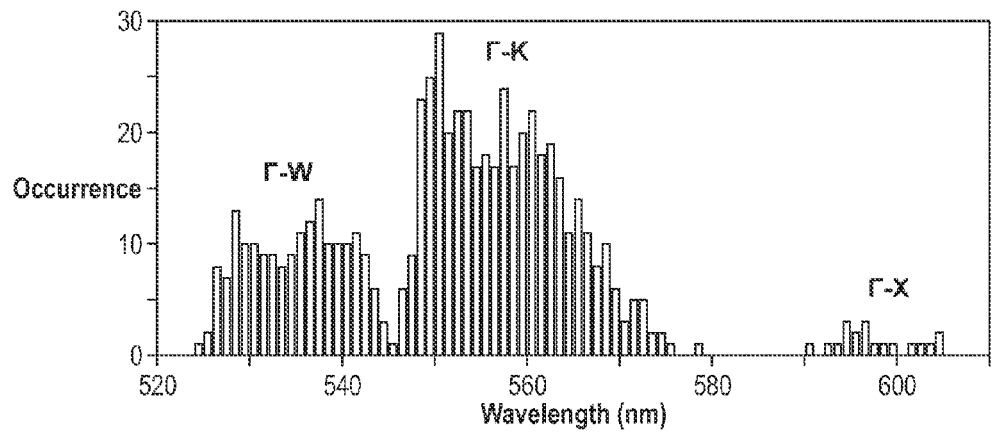
FIG. 5G is a histogram of transmission minima showing the inhomogeneous broadening of the photonic crystal stop bands due to slight structural and dielectric variations throughout the scale of FIG. 5A.

FIG. 5G summarizes the data for 450 hot spots, recorded beneath five different beetle scales, by plotting a histogram of the transmission minima wavelengths. Three distinct spectral ranges are identified, which match extremely well with the calculated Γ-W, Γ-K, and Γ-X stop gaps of the diamond-based photonic crystal discussed above. The longest wavelength transmission stop bands, which correspond to the Γ-X top-oriented domains, arise only occasionally. Because of the 10-20% lattice parameter variation of this natural photonic crystal structure observed in SEM, it can be shown that the transmission minima of a particular domain vary locally, giving rise to the scatter seen in the histogram. The facile optical technique described herein, which probes the bulk material, can therefore reveal structural inhomogeneities previously only accessible with more elaborate surface-sensitive SEM methods.

The hot spot emission under two-photon excitation is comparable in intensity to efficient fluorophores in single molecule experiments. It is surprising that the hot spot brightness is only attenuated approximately half-fold by the strongly scattering photonic crystal. The close proximity between the nanobeacon and the sample enables efficient near-field coupling, comparable to the case of a near-field microscope. This efficient near-field coupling enables the white light to be effectively propagated within the photonic crystal. As the hot spot emission originates from a subdiffraction area (as documented by the Airy rings in inset 116 of FIG. 5E), the transmission experiment may probe subdiffraction cross sections of suitably thin samples.

Figure 6A:
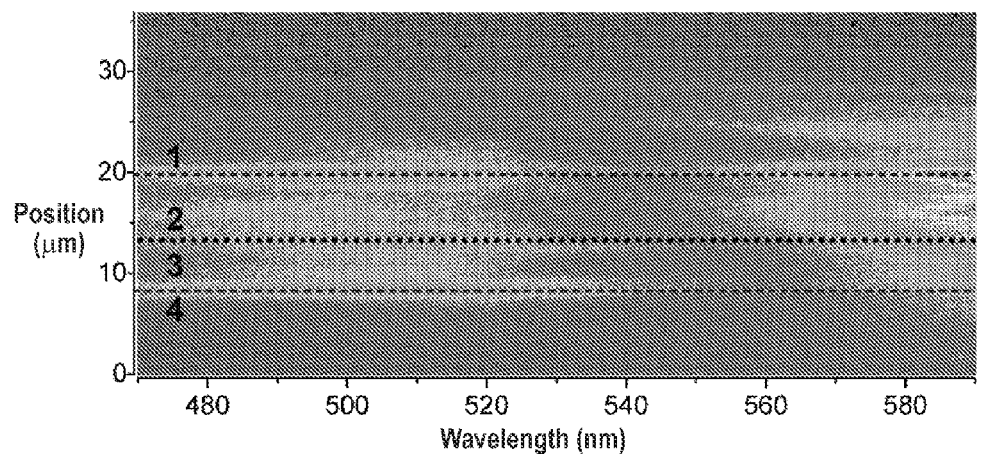
FIG. 6A is a spatially resolved hot spot transmission spectra revealing the lateral boundary between two differently oriented crystal domains a scale of the beetle of FIG. 4A.
Figure 6B:
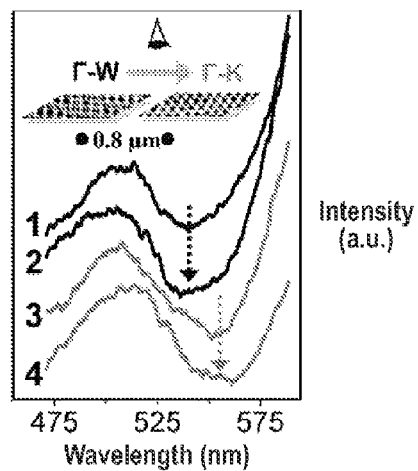
FIG. 6B is a transmission spectra illustrating a transition from the Γ-W to the Γ-K facet in a scale of the beetle of FIG. 4A.

As it emanates from the hot spots and passes through a specimen of thickness ~10 μm, such as a beetle scale, as expected the light cone broadens and diffuses, leading to images of the hot spots through the beetle scale that appear less sharp (FIG. 5E). Nevertheless, the images still provide clear structural details and boundaries that are not visible with conventional transmission microscopes. FIG. 6A shows the transmitted hot spot spectra as a function of position along the beetle scale 108 on an intensity color-scale representation. When a hot spot is present at a given position, a dip in the emission occurs in the region 520-570 nm. Close inspection of the transmission spectra in FIG. 3B reveals a transition from the Γ-W to the Γ-K top-oriented facet. The transition between domains occurs within ~800 nm of the dotted black line marked in the figure, which is in agreement with the general observations from electron microscopy (FIG. 4D).

Figure 6C:
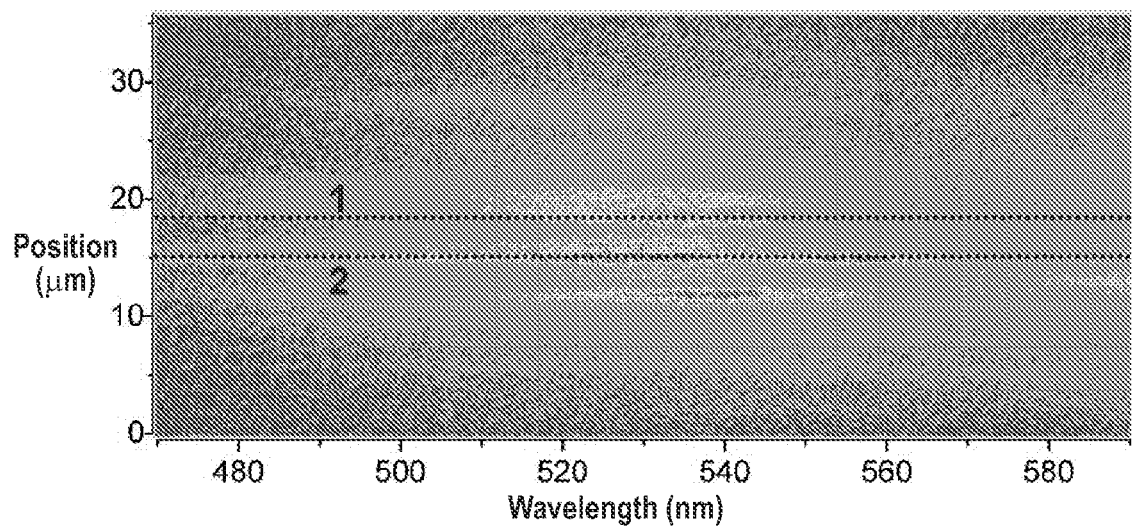
FIG. 6C is a high resolution transmission spectra revealing the stacking of different crystal facets within a scale of the beetle of FIG. 4A.
Figure 6D:
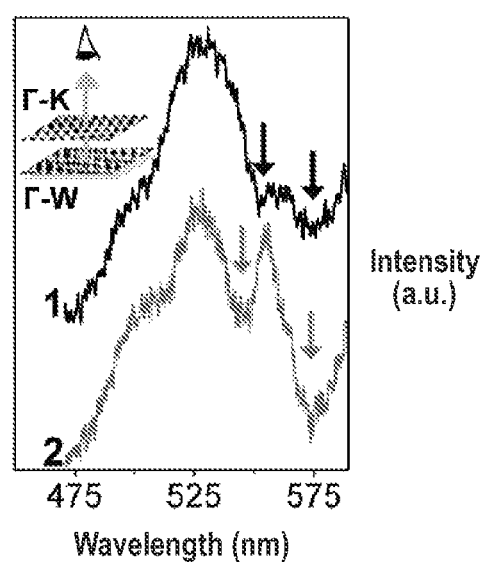
FIG. 6D is a transmission spectra showing how the stacking of different crystal facets results in the appearance of two stop bands at certain spatial coordinates on the sample.

The systems and methods of the present invention can also identify vertical domain variations within the beetle scale 108, which are masked in the surface-sensitive SEM. FIG. 6C displays the spectra of a line of hot spots imaged along the scale 108. Whereas most spectra display just one discrete minimum, the two positions labeled in the figure indicate simultaneous light transmission through Γ-W and Γ-K top-oriented domains. The transmission spectra in FIG. 6D correspondingly reveal two dips at 540 and 575 nm.

In light of the disclosure herein, it will be appreciated by one of ordinary skill in the art that the systems and methods of the present invention may be used as a refractive index sensor. More specifically, the systems and methods of the present invention may be used to probe the local refractive index of photonic crystals. A photonic crystal functions much like a diffraction grating which splits and diffracts light into several beams travelling in different directions. At certain wavelengths and orientations of incident light, the photonic crystal causes constructive or destructive interference. Thus, the wavelength/frequency of the light transmitted through a photonic crystal can be measured and used to determine the refractive index of the photonic crystal. Even a small change in the refractive index of the photonic crystal will cause a change in the wavelength at which a transmission minimum is observed. As a result of the nanoscale light beacons used in the present invention, much smaller volumes of the photonic crystal can be probed and very small perturbations in the refractive index can be detected.

Using nanoparticle hot spots as spectrally broad nanoscale light sources provides additional advantages. For instance, nanoparticles can be selectively addressed, allowing a scanning of the sample illumination without moving the sample or the light source. Different hot spots can be excited by varying the polarization and wavelength of the light, and even by applying sophisticated pulse-shaping techniques that allow direct coherent control of the plasmon excitation. Even the random blinking in the hot spot emission can be exploited to construct a high-resolution transmission image using photobleaching localization microscopy. The addressability of white-light hot spots can be further enhanced by engineering artificial metal nanoparticle aggregates.

Many phenomena in the life sciences and in materials science are strictly controlled by the mesoscopic ordering of the bulk. Common examples where access to the overall morphology is important include tumor malignancy tests, bone structure, stress and thermal degradation processes in amorphous materials, such as organic semiconductors, and the like. The systems and methods of the present invention can image the absorption or scattering of light in volumes of sub-cellular cross sections.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing transmission microscopy on a sample material, the method comprising:
   placing a sample material adjacent to a substrate comprising one or more nanoparticles;
   exciting the one or more nanoparticles to cause the one or more nanoparticles to emit white light;
   passing the emitted white light through the sample material; and
   detecting the emitted white light that passed through the sample material.

2. The method as recited in claim 1, wherein the one or more nanoparticles comprise a noble metal or a coinage metal.

3. The method as recited in claim 1, wherein the one or more nanoparticles comprise silver nanoparticles.

4. The method as recited in claim 1, wherein the substrate comprises a silver nanoparticle substrate formed by the Tollens silver mirror reaction.

5. The method as recited in claim 1, wherein the sample is placed directly on the substrate.

6. The method as recited in claim 1, wherein exciting the one or more nanoparticles comprises cathodoluminescence, electroluminescence, chemiluminescence, directing an infrared light onto the substrate, directing a visible light onto the substrate, or a combination thereof.

7. The method as recited in claim 1, wherein the one or more nanoparticles can be selectively excited by varying at least one of a polarization and a wavelength of a laser beam used to excite the one or more nanoparticles.

8. The method as recited in claim 1, wherein the methods enables the detection of perturbations in the refractive index of the sample material.

9. A system for performing transmission microscopy of a sample material, comprising:

a film comprising silver nanoparticles and being adapted to have a sample material positioned thereon, wherein the silver nanoparticles emit white light when the silver nanoparticles are excited, the white light being passed through the sample material;

excitation means adapted to generate light that can be directed at the film to excite the silver nanoparticles; and a detector adapted to detect the white light that is passed through the sample material.

10. The system as recited in claim 9, wherein the excitation means comprises an infrared laser.

11. The system as recited in claim 9, further comprising a dichroic mirror that is adapted to reflect the light generated by the excitation means toward the film.

12. The system as recited in claim 11, wherein the dichroic mirror is placed between the film and the detector such that the white light emitted by the silver nanoparticles passes through the dichroic mirror before reaching the detector.

13. The system as recited in claim 11, wherein the sample material is placed on the film such that the sample material is positioned between the film and the dichroic mirror.

14. The system as recited in claim 9, wherein said system functions as a refractive index sensor capable of detecting perturbations in the refractive index of a sample material.

15. A method for performing transmission microscopy on a sample material, the method comprising:

generating an infrared light;

reflecting the infrared light off a dichroic mirror;

directing the reflected infrared light through a sample material and onto a nanoparticle film;

exciting one or more nanoparticles in the nanoparticle film to cause the one or more nanoparticles to emit white light;

passing the emitted white light through the sample material and through the dichroic mirror; and detecting the emitted white light that passed through the sample material.

16. The method as recited in claim 15, wherein the one or more nanoparticles comprise one or more metals.

17. The method as recited in claim 16, wherein the one or more metals comprise silver.

18. The method as recited in claim 15, wherein directing the reflected infrared light comprises passing the reflected infrared light through an objective.

19. The method as recited in claim 15, further comprising passing the emitted white light through an emission filter.

20. The method as recited in claim 15, wherein detecting the emitted white light comprises using a spectrometer, photographic plate, a digital medium, or an eye.

* * * * *